Oct. 21, 1924.  
J. L. DROHEN  
SIGNAL ATTACHMENT FOR AUTOMOBILES  
Filed Sept. 12, 1923  
1,512,829
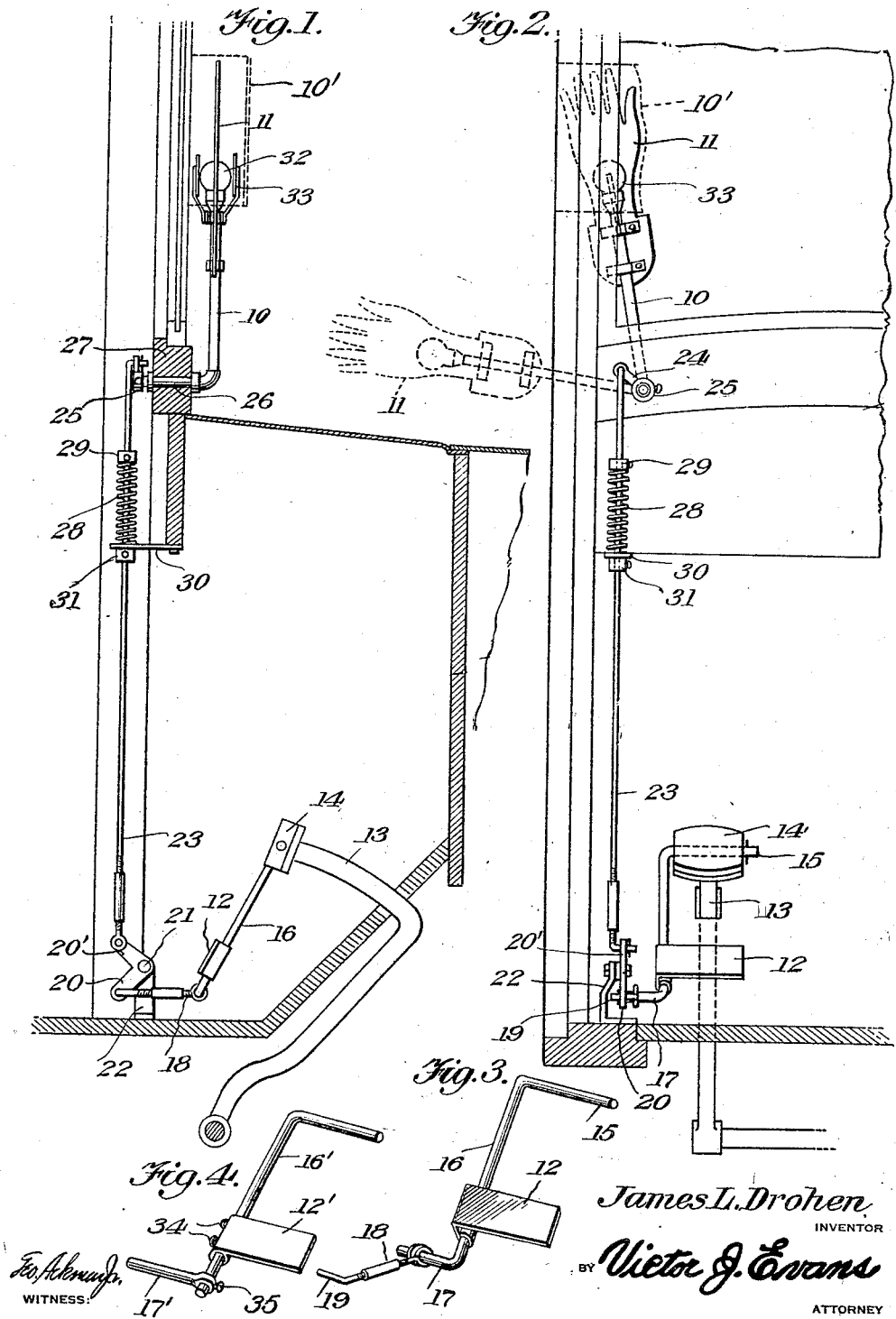
James L. Drohen  
INVENTOR  
BY Victor J. Evans  
ATTORNEY Patented Oct. 21, 1924.

1,512,829

UNITED STATES PATENT OFFICE.

JAMES L. DROHEN, OF WASHINGTON, DISTRICT OF COLUMBIA.

SIGNAL ATTACHMENT FOR AUTOMOBILES.

Application filed September 12, 1923. Serial No. 662,327.

*To all whom it may concern:*

Be it known that I, JAMES L. DROHEN, a citizen of the United States, residing at Washington, in the District of Columbia, have invented new and useful Improvements in Signal Attachments for Automobiles, of which the following is a specification.

This invention relates generally to automobile signals.

The chief characteristic of this invention resides in the use of an auxiliary pedal for operating the signal, and adapted to be supported by one of the control pedals of the vehicle.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view partly in section showing the application of the invention to a motor operated vehicle.

Figure 2 is a sectional view taken at a right angle to Figure 1, showing the normal position of the signal by full lines, and the active position of the signal by dotted lines.

Figure 3 is a detail view of the auxiliary pedal.

Figure 4 is a similar view of a modified construction.

Before entering into a detail description of what is illustrated in the drawing, I desire to have it understood that I do not limit myself to any particular form or character of signal, in that the invention may be used with a mechanical or an electrical signal operated by any suitable means, the basic idea residing in the use of an auxiliary pedal to control the signal and which pedal is adapted to be associated with one of the control pedals of the vehicle.

I have however elected to show the application of the invention in conjunction with a mechanically operated signal, consisting of an arm 10 supporting a member 11 designed to represent a hand. The arm normally occupies a vertical position at one side of the car, preferably adjacent the windshield, and adapted to be swung to a horizontal position for use. Normally the hand member 11 is concealed from view within a shield or housing 10'.

Now, for controlling the operation of the signal, I employ an auxiliary pedal 12 associated with one of the control pedals 13 of the vehicle, so that the signal can be actuated simultaneously with the depression of said control pedal, or independently of any movement thereof. The auxiliary pedal 12 is preferably suspended from the vehicle pedal 13, although it can be arranged in a manner to be conveniently engaged by the foot of the operator. As shown in this specific instance, the vehicle pedal 13 has secured thereto, a block 14 having a bore to receive the adjacent offset extremity 15 of the auxiliary pedal shank. This shank 16 hangs from the vehicle pedal and has its other extremity reversely offset as at 17 for association with any suitable mechanism providing a connection between the auxiliary pedal 12 and the signal. Manifestly, the shank 16 is susceptible of swinging or pivotal movement so that when the auxiliary pedal 12 is depressed, the signal is operated.

The connection herein shown, between the pedal 12 and the signal is merely illustrative, and of no particular moment as various means may be used to accomplish the same result. However, the offset extremity 17 of the pedal shank is connected with one end of a rod 18, the opposite end being offset as at 19 to be received by an opening in the branch 20 of a bell crank lever. As shown this rod 18 may include a turn buckle to adjust the length of the rod if necessary. This lever is fulcrumed as at 21 upon a bracket 22 secured to the floor board of the vehicle. The other branch 20' of this bell crank lever is connected with the adjacent end of a reciprocatory rod 23, the opposite end of which is connected with an apertured extension 24 projecting from the collar 25 fixed on the angular extremity 26 of the signal arm 10. This extremity 26 is journalled in the wind shield frame 27, so that the arm 10 can be swung to a horizontal active position, and subsequently returned to its normal vertical position. If desired this rod 23 may include a turn buckle, so that the length of the rod may be adjusted. By reason of the construction shown, it is obvious that when the auxiliary pedal 12 is operated, the signal arm 10 is swung to an active horizontal position, and when pressure is removed from the auxiliary pedal, the arm is automatically returned to normal position through the instrumentality of a coiled spring 28. This spring encircles the rod 23 and has one end bearing against an abutment 30 through which the rod 23 reciprocates. The rod 23 is also provided with a stop collar 31 which is adapted to engage the abutment 30 and thus limit the movement of the rod 23 under the influence of the spring 28.

If desired, the signal member proper which represents a hand and indicated at 11 may be provided with an opening to accommodate an electric light bulb 32, and this bulb may be connected in circuit with any suitable switch, not shown, as this does not form any part of the invention. Of course, the switch can be manually or otherwise operated to close the circuit at night time for the purpose of illuminating the signal member. In order to direct the light rays on both sides of the hand member 11, I make use of reflectors 33 which are carried by the arm and arranged at the opposite sides of the electric light bulb.

In Figure 4, I have illustrated a modified form of the invention, wherein the auxiliary pedal 12′ is mounted upon the shank 16′ for sliding adjustment, thus permitting the pedal to be arranged in the most convenient position for the operator. The auxiliary pedal 12′ is equipped with set screws 34 by means of which the pedal is held fixed relative to the shank in any given position. The shank 16′ is adapted to be associated with the control pedal of the vehicle in the same manner as hereinabove described and clearly shown in the drawing. However, instead of the lower extremity of the shank being offset as at 17, I make this extremity 17′ as a separate piece, which is provided with an eye to receive the shank 16′. Consequently the adjustment can be made between the member 17′ and the shank of the pedal should the occasion require the same.

The member 17′ is held fixed relatively to the shank by means of a set screw 35 as shown in Figure 4.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. The combination with an automobile signal and a control pedal, of means for operating said signal and including a pedal shank suspended from said control pedal, and an auxiliary pedal carried by said shank and arranged beneath and in parallelism with the control pedal to be operated by the heel simultaneously with or independently of the operation of the control pedal.

2. A signal operated mechanism for motor operated vehicles having a control pedal, said mechanism including a shank suspended from and pivotally supported by the control pedal, and an auxiliary pedal slidably adjustable on said shank and adapted to be positioned to be actuated by the heel of the operator simultaneously with or independently of the depression of the control pedal.

3. A signal operating mechanism for motor operated vehicles having a control pedal, said mechanism including an operating rod, a shank suspended from and pivotally supported by the control pedal, the lower extremity of said shank being offset and connected with the operating rod, and an auxiliary pedal adjustably mounted on said shank and arranged beneath and in parallelism with the control pedal, whereby said signal can be actuated simultaneously with or independently of the depression of the control pedal.

In testimony whereof I affix my signature.

JAMES L. DROHEN.